US012749918B2

(12) United States Patent
Bowles et al.

(10) Patent No.: US 12,749,918 B2
(45) **Date of Patent: *Sep. 29, 2026**

(54) CUPHOLDER WIRELESS CHARGER

(71) Applicant: SCANSTRUT LIMITED, Exeter (GB)

(72) Inventors: George Bowles, Exeter (GB); Nigel Smith, Exeter (GB)

(73) Assignee: SCANSTRUT LIMITED, Exeter (GB)

( * ) Notice: Subject to any disclaimer, the term of this patent is extended or adjusted under 35 U.S.C. 154(b) by 615 days.

This patent is subject to a terminal disclaimer.

(21) Appl. No.: 18/213,592

(22) Filed: Jun. 23, 2023

(65) Prior Publication Data

US 2023/0411998 A1 Dec. 21, 2023

Related U.S. Application Data

(63) Continuation of application No. 18/211,891, filed on Jun. 20, 2023.

(60) Provisional application No. 63/353,161, filed on Jun. 17, 2022, provisional application No. 63/353,163, filed on Jun. 17, 2022.

(51) Int. Cl.

| | |
|---|---|
| ***H02J 50/00*** | (2016.01) |
| ***B60R 16/03*** | (2006.01) |
| ***H02J 7/70*** | (2026.01) |
| ***H02J 50/10*** | (2016.01) |
| ***H02J 50/40*** | (2016.01) |

(52) U.S. Cl.
CPC ............ *H02J 50/005* (2020.01); *B60R 16/03* (2013.01); *H02J 7/731* (2026.01); *H02J 50/10* (2016.02); *H02J 50/402* (2020.01)

(58) Field of Classification Search
CPC .......... H02J 50/005; H02J 7/731; H02J 50/10; H02J 50/60; H02J 50/80; H02J 50/90; H02J 50/402; B60R 16/03
USPC .......................................................... 320/108
See application file for complete search history.

(56) References Cited

U.S. PATENT DOCUMENTS

2016/0204644 A1* 7/2016 Dukerschein ........... H02J 50/10 320/108
2023/0163634 A1* 5/2023 Yankowitz .............. H02J 7/731 320/108

* cited by examiner

*Primary Examiner* — Paul Dinh
(74) *Attorney, Agent, or Firm* — DeLio Peterson & Curcio LLC; Kelly M. Nowak

(57) ABSTRACT

Apparatus, systems and methods for a waterproof wireless device charging system that includes a wireless charging body having an upwardly extending back portion with an angled receiving surface for receiving a wireless device in need of charging. A wireless energy transmitter is retained within the back portion of the charging body. A lower portion of the charging body resides in a cupholder opening in a mounting surface, which may be exposed to harsh movements, conditions, or elements deleterious to effective wireless charging. A gasket resides between the charging body and the mounting surface and provides for a waterproof installation. When charging, the device in need of charging resides on the angled receiving surface and is secured thereto.

20 Claims, 7 Drawing Sheets

CUPHOLDER WIRELESS CHARGER

BACKGROUND OF THE INVENTION

1. Field of the Invention

The present invention relates to apparatus, systems, and methods for enabling waterproof wireless charging or power supply to one or many receivers placed on a wireless charger or power supply.

2. Description of Related Art

Wireless technologies for powering and charging mobile and other electronic or electric devices, batteries and vehicles are known. These systems generally use a wireless power charger or transmitter, and a wireless power receiver in combination, to provide a means for transfer of power. In a typical system, the charger and receiver coils are aligned and of comparable or similar size. A user must place their device or battery to be charged in a specific location with respect to the charger. While these chargers may be installed in stationary, non-moving locations (e.g., homes, offices, restaurants, coffee shops, bars, public places, etc.), they are also installed in locations that have movement and/or turbulence. For instance, chargers may be installed in moving vehicles including automobiles, trucks, motorcycles, trains, public transport systems, ships, boats, airplanes, and other vehicles. Challenges arise in installing chargers in these types of moving vehicles that firmly and efficiently hold and secure mobile and other electronic/electric devices therein for effective charging. These are the general areas that embodiments of the invention are intended to address.

SUMMARY OF THE INVENTION

Bearing in mind the problems and deficiencies of the prior art, it is therefore an object of the present invention to provide apparatus, systems, and methods that firmly and efficiently hold and secure mobile and other electronic/electric devices in a magnetic or non-magnetic wireless charging apparatus.

Another object of the present invention is to provide apparatus, systems and methods that include a wireless charging assembly that securely and reliably holds a wireless enabled device therein for effective charging in settings or environments having or exposed to moisture, water and/or outdoor elements or outdoor environments.

It is another object of the present invention to provide apparatus and wireless charging systems suitable for installation in cupholders in outdoor recreational settings and/or moving vehicles.

Still other objects and advantages of the invention will in part be obvious and will in part be apparent from the specification.

The above and other objects, which will be apparent to those skilled in the art, are achieved in the present invention which is directed to a waterproof wireless device charging system that includes a wireless charging body having a lower portion, an upper flange portion, and an angled back portion. The angled back portion has a hollow internal center and a sloped receiving surface. The wireless charging body has an opening at a top side for receiving a wireless charging device. The system also includes a waterproof gasket and a wireless energy transmitter having one or more wireless charging units. In installation, the system includes the wireless energy transmitter inserted into and secured within the hollow internal center of the angled back portion. The waterproof gasket resides between and contacts both the upper flange portion and a mounting surface. The lower portion of the wireless charging body is secured within a mounting surface opening of the mounting surface. The one or more wireless charging units of the transmitter are adjacent the sloped receiving surface for securing the wireless charging device inserted into the opening at the top side of the wireless charging body.

In one or more embodiments the upper flange portion may reside above and extend outward from the lower portion. The opening at a top side of the wireless charging body may be formed by the lower portion, upper flange, and angled back portion. The angled back portion may have a shape, size, and slope configured to allow resting of the wireless charging device. The wireless charging system may be permanently or semi-permanently installed in the mounting surface. The mounting surface opening may be cupholder opening in the mounting surface, and may be a preexisting cupholder or a newly formed cupholder.

In embodiments of the invention, the mounting surface may have a shape selected from the group consisting of round, semi-round, oval, semi-oval, square, semi-square, rectangular, semi-rectangular and any other geometric shape. The waterproof gasket may be attached to an underside of the upper flange and the mounting surface using a waterproof adhesive. The mounting surface opening may be a two-stage opening, whereby at least the waterproof gasket resides within and is adhered to mounting surface material residing at a bottom of one of the two-stage openings. The charging systems of the invention may further include a tension lever residing within the opening at the top side of the wireless charging body. The tension lever moves forward and backward with respect to the sloped receiving surface for applying pressure to a front side of the wireless charging device residing in the opening.

In one or more embodiments the wireless charging body may be a monolithic one-piece structure with the sloped receiving surface comprising a part of the wireless charging body. In other embodiments the wireless charging body may include a separate component at the sloped receiving surface. In these embodiments the transmitter may include at least a main body portion and a tab extending from the main body portion. The angled back portion of the charging body may include at least a first opening for receiving the main body portion and a second opening for receiving the tab to secure the transmitter inside the hollow internal center of the angled back portion. The sloped receiving surface may be a strong planar non-conductive layer of glass affixed to a front of the angled back portion to cover portions of the wireless energy transmitter extending out the first opening and the second opening and provide a watertight seal to back portion of the charging body.

Embodiments of the invention are also directed to waterproof wireless device charging systems that include a wireless charging body having a lower portion adapted to fit into a cupholder opening in a mounting surface, an upper flange portion, and an angled back portion, the angled back portion having a hollow internal center and a sloped receiving surface. The wireless charging body has an opening at a top side for receiving a wireless charging device. The system also includes a waterproof gasket and a wireless energy transmitter having at least three overlapping wireless charging units. In installation, the system includes the wireless energy transmitter inserted into and secured within the hollow internal center of the angled back portion. The waterproof gasket resides between and contacts both the upper flange portion and a mounting surface. The lower portion of the wireless charging body is secured within the cupholder opening in the mounting surface. The at least three overlapping wireless charging units of the transmitter are adjacent the sloped receiving surface for securing the wireless charging device inserted into the opening at the top side of the wireless charging body.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

DESCRIPTION OF THE EMBODIMENT(S)

In describing the embodiment of the present invention, reference will be made herein to FIGS. 1-13 of the drawings in which like numerals refer to like features of the invention.

In accordance with one or more embodiments, the invention is directed to wireless charging apparatus, systems and methods that provide wireless charging of wireless enabled devices. The apparatus, systems and methods of the invention include a magnetic or non-magnetic wireless charging assembly that securely and reliably holds a wireless enabled device(s) therein for effective charging. The present wireless charging apparatus of the invention are suitable for installation in outdoor recreational settings and/or moving vehicles, including those having exposure to moisture, water and/or outdoor elements or outdoor environments (e.g., sun, wind, high or low temperatures, humidity, rainfall, waves, uneven or turbulent land or road, etc.) They may be installed in preexisting openings in a mounting surface (e.g., in a preexisting cupholder), or a new opening may be formed in the mounting surface to accommodate the present magnetic or non-magnetic wireless charging assemblies. In accordance with the invention, the wireless chargers may be permanently, or semi-permanently, installed in boats, ships, motorcycles, RVs, automobiles, trucks, trains, public transport systems, airplanes, and other moving vehicles both having and not having exposure to moisture, water and/or outdoor elements or environments.

Referring to FIGS. 1-13, one or more embodiments of the present magnetic or non-magnetic wireless charging systems 100 are shown for permanent, optionally semi-permanent, affixation to a mounting surface 30. The mounting surface 30 may be a surface of an object that is exposed to outdoor settings, moisture, and/or water exposure. The magnetic or non-magnetic wireless charging systems 100 enable wireless charging in circumstances where the wireless charging station or system is installed in a location and is not intended to be moved. While certain embodiments are directed to permanent affixation, other embodiments are directed to semi-permanent affixing the wireless charging systems 100 to the mounting surface 30 to provide easy removal thereof in the event the charging assembly needs to be repaired or replaced.

Figure 1:
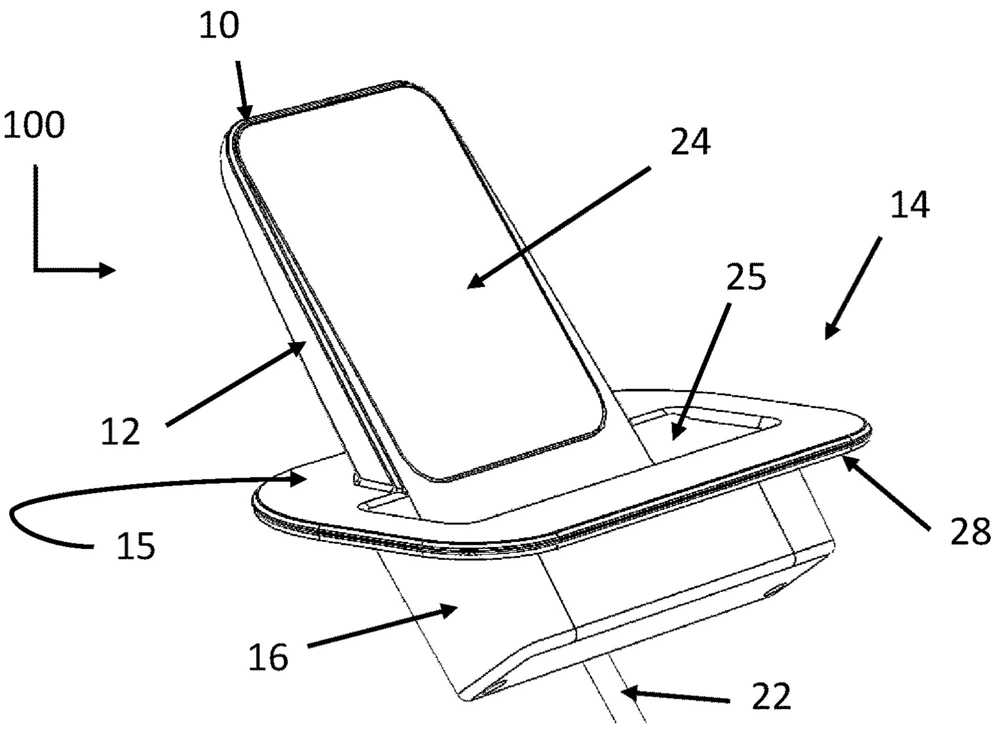
FIG. 1 illustrates a waterproof magnetic wireless phone charger apparatus and system that is secured in an opening of a mounting surface in accordance with one or more embodiments of the invention.
Figure 2:
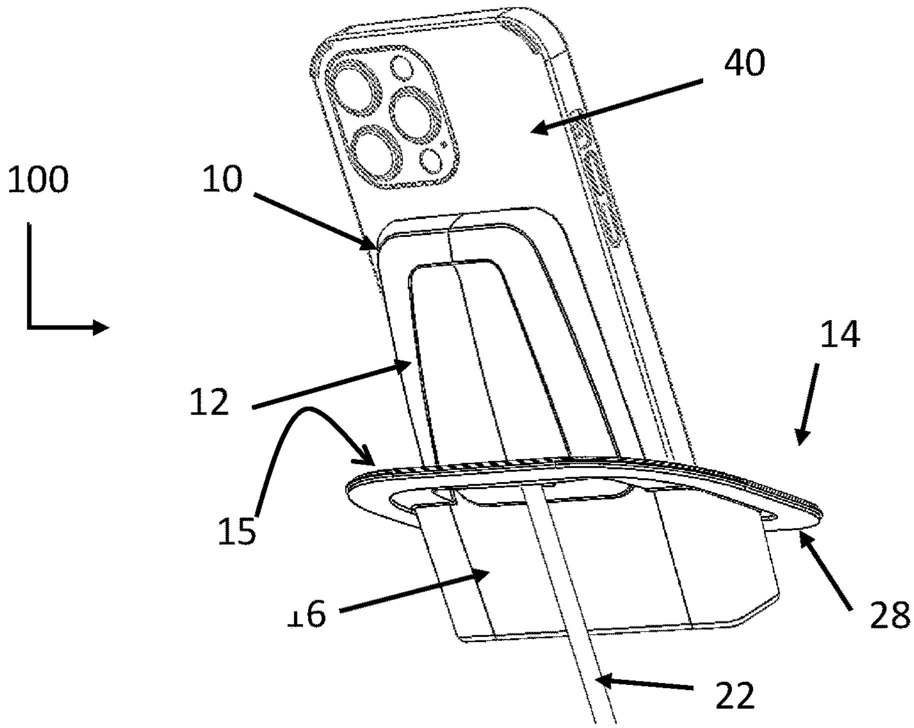
FIG. 2 illustrates a backside of the waterproof magnetic wireless phone charger apparatus and system of FIG. 1 securely holding a wireless mobile phone.
Figure 4:
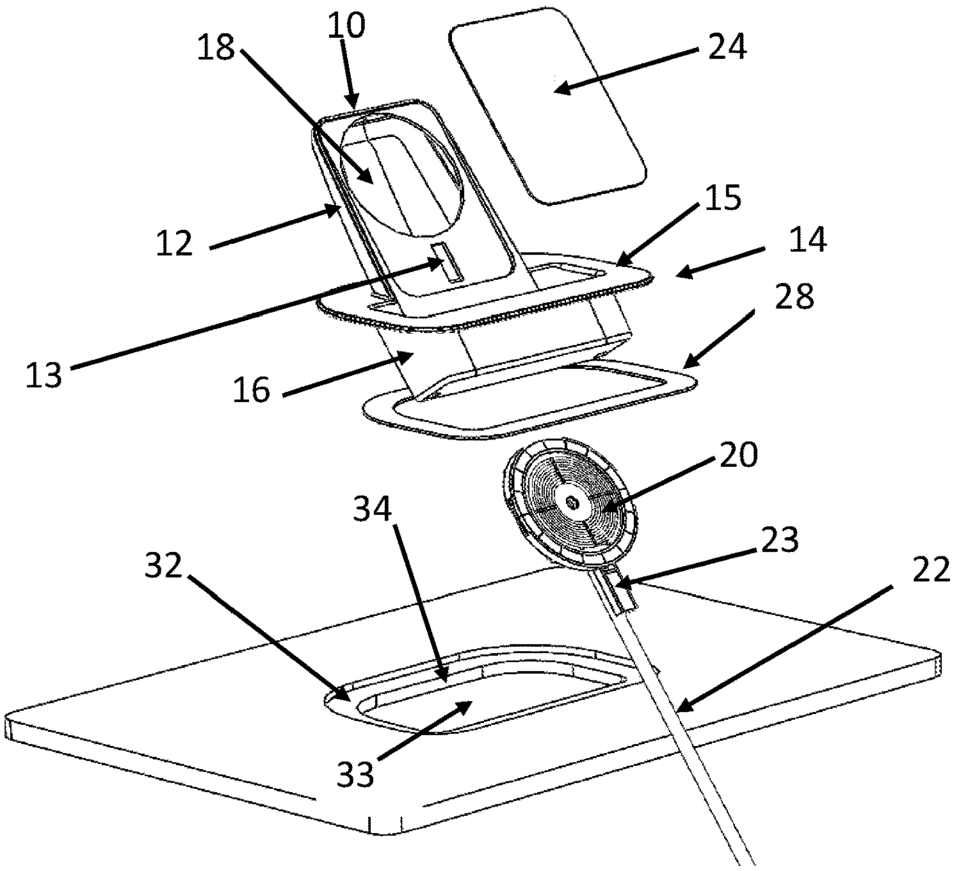
FIG. 4 illustrates a system and method of assembly of the waterproof magnetic wireless phone charger apparatus of FIG. 1 into an opening in a receiving surface for providing waterproof wireless charging or power supply in accordance with the invention.
Figure 5:
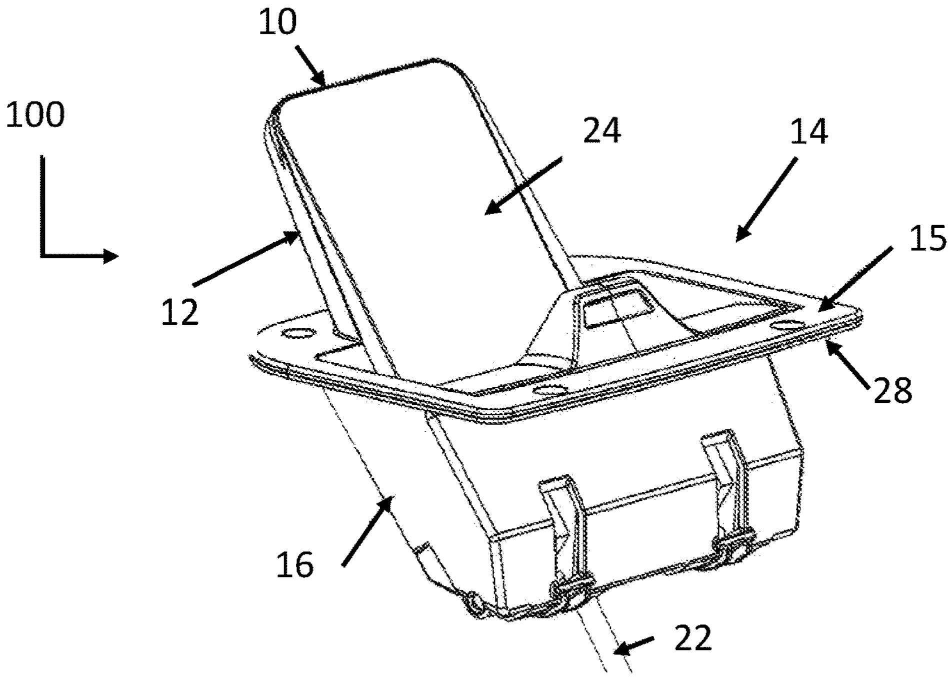
FIG. 5 illustrates another waterproof magnetic wireless phone charger apparatus and system in accordance with one or more embodiments of the invention.
Figure 6:
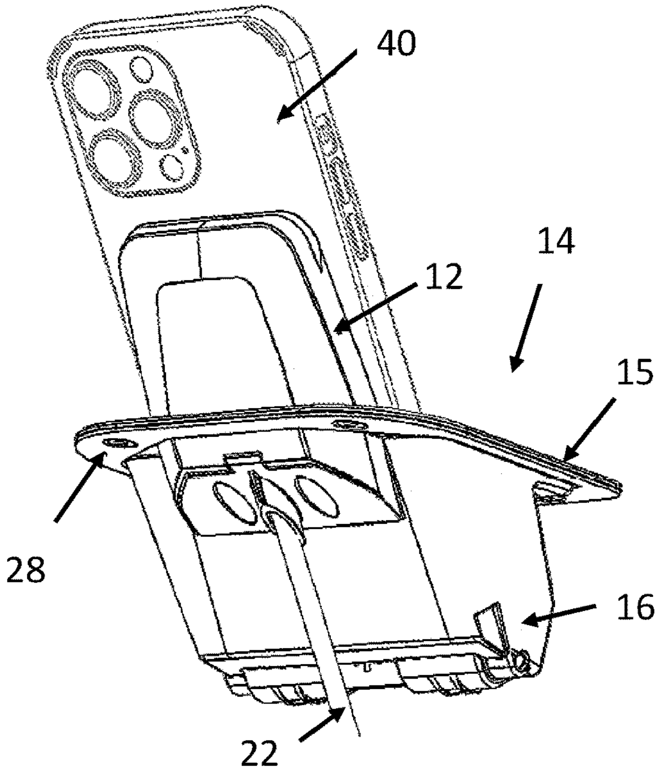
FIG. 6 illustrates a backside of the waterproof magnetic wireless phone charger apparatus and system of FIG. 5 securing a wireless mobile phone.

As shown in the perspective front view of FIG. 1, in one or more embodiments the apparatus and systems of the invention include at least a magnetic or non-magnetic wireless charging body or apparatus 10. The wireless charging body 10 includes a base portion 14 having a lower portion 16 extending from an upper flange portion 15, which extends above and outward from the lower portion 16. Extending above the upper flange 15 of base portion 14 is a slanted or angled wireless charger back portion 12 of charging body 10 that has a shape, size, and slope configured to allow resting of a wireless charging device 40 thereon. Referring to FIGS. 2 and 4, once the wireless charging system 100 is installed and secured within the opening 33 in mounting surface 30, the back portion 12 has a slope with respect to the top planar surface of mounting surface 30 for resting the portable device 40 in need of charging thereon.

Together the lower portion 16, upper flange portion 15 and angled back portion 12 of the charging body 10 form an opening 25 at a top side of the magnetic wireless charging body 10 for receiving a wireless charging device 40. The opening 25 may include a variety of different shapes and sizes to accommodate, fit, and receive a wireless device in need of charging. The opening 25 also has an internal sloped receiving surface 24 for receiving and holding device 40.

For instance, while not meant to be limiting, the opening 25 may include an open cup, a pocket, a slot, and the like. It should be appreciated that the magnetic wireless charging body 10 itself, along with its various parts, may include any shape and size so as to fit into a particular opening 33 or space on or in the mounting surface 30, as well as to accommodate, fit, and receive a wireless device for charging. Optionally, in certain embodiments of the invention, the base portion 14 of the magnetic wireless charging body 10 may be provided with a component for removing any water collected in charging body opening 25.

The present magnetic or non-magnetic wireless charging systems 100 may be secured in a preexisting or newly formed opening 33 in the mounting surface 30. While not meant to be limiting, in one or more preferred embodiments the wireless charging systems 100 may be secured in a preexisting or newly formed rectangular or square opening 33 in the mounting surface (see, e.g., FIG. 4). Alternatively, in one or more other preferred embodiments the wireless charging systems 100 may be secured in a preexisting or newly formed round or oval opening 33 (e.g., a preexisting or newly formed cupholder opening) in mounting surface 30 (see, e.g., FIG. 12). It should be appreciated that the shape of opening 33 and wireless charging systems 100 are not limited to rectangular, square, round, oval, circular, etc., but rather may include any shape and size to accommodate an end user's needs.

Figure 3:
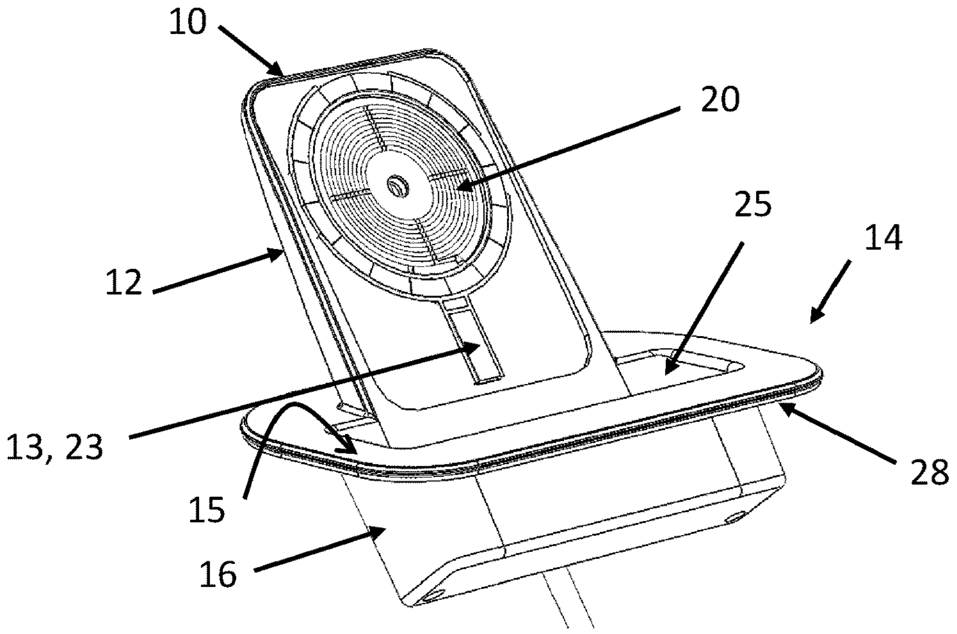
FIG. 3 illustrates, in accordance with one or more embodiments of the invention, a system and assembly of a magnetic wireless energy transmitter securely affixing within an apparatus of the invention.
Figure 7:
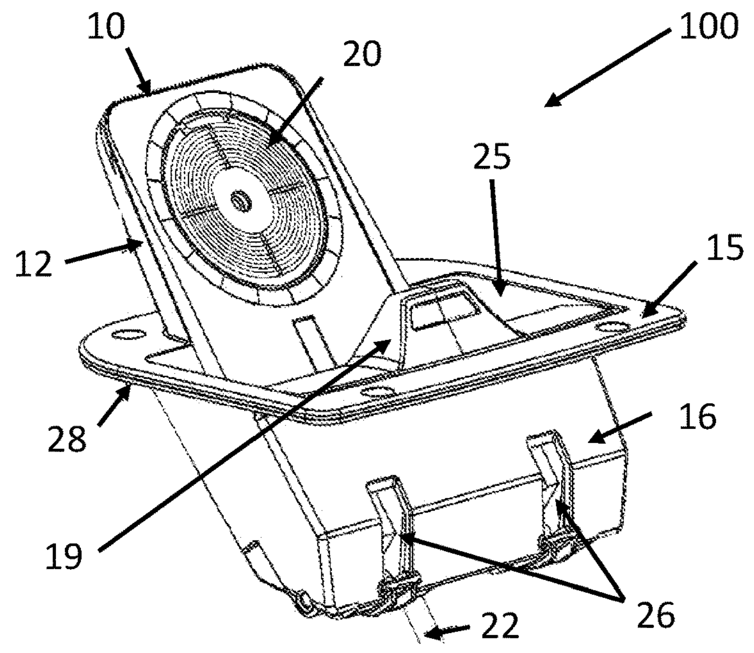
FIG. 7 illustrates, in accordance with one or more embodiments of the invention, another secure assembly of a magnetic wireless energy transmitter in a waterproof magnetic charging apparatus of the invention.

In one or more embodiments the slanted or angled back portion 12 of charging body 10 may include one or more openings for receiving and securing a magnetic or non-magnetic wireless energy transmitter 20 therein. Referring to FIGS. 3, 4 and 7, the wireless energy transmitter 20 may be a magnetic wireless energy transmitter including a main body portion, a power cord 22 connected to the main body portion, and a tab or pin 23 extending from the main body portion to help secure the transmitter 20 inside the angled back portion 12 of charging body 10. Referring to FIG. 4, in one or more embodiments the angled back portion 12 may be hollow providing an opening 18 for receiving and holding the main body portion of transmitter 20. Angled back portion 12 may also include a clamping opening 13 that mates with the tab or pin 23 of transmitter 20. In assembling the present charging system, referring to FIGS. 3 and 4 transmitter 20 is inserted up into the angled back portion 12 of charging body 10, whereby the main body portion is received in opening 18 and the tab/pin 23 is received and securely locked into clamping opening 13. Once installed, the magnetic wireless energy transmitter 20 is locked in position inside the angled back portion 12, while power cord 22 extends out of the charging body 10 for connection to a source of power. For instance, referring to FIG. 2 the power cord 22 may extend out of angled back portion 12.

In those embodiments having openings 13, 18 in the angled charging surface 24 of back portion 12, the angled charging surface 24 may comprise a separate component that is attached to the back portion to form angled charging surface 24. In one or more embodiments, the angled charging surface 24 may be a thin, strong planar non-conductive sheet (or layer) of glass that is securely attached to the angled front side of back portion 12 to both cover the portions of magnetic wireless energy transmitter 20 extending out openings 13, 18, as well as to provide a watertight seal to back portion 12 of the charging body 10. The glass covering may be adhered to the back portion 12 using a waterproof adhesive or sealant to provide a waterproof or watertight connection between the back portion and glass angled charging surface 24. At least the outer surface of the glass that is exposed to the outside environment may be coated with a UV stable material to provide a UV stable glass charging surface 24. In these embodiments it has been found that the UV stable non-conductive glass charging surface 24 provides both a waterproof or watertight seal and maximizes the connection between magnets 21 in transmitter 20 and magnets in the device 40 being charged. That is, the magnetic device 40 in need of charging is held more strongly in place to the magnets in the transmitter 20 when such magnets are separated from one another by the angled glass layer charging surface 24.

In other embodiments of the invention, referring to FIGS. 9-13, the angled back portion 12 may be a solid structure having a single central opening for receiving a magnetic or non-magnetic wireless energy transmitter 20 therein. For instance, referring to FIG. 11 the wireless energy transmitter 20 may be a wireless energy transmitter including a main body portion having three (3) overlapping wireless chargers, and a power cord 22 connected to the main body portion. In these embodiments, the angled planar front surface 24 of angled back portion 12 has no openings and comprises a material of the charging body 10 itself, preferably a non-conductive material to provide the angled non-conductive charging surface 24. Like other embodiments of the invention, this non-conductive charging surface 24 resides at the front of back portion 12, and contacts and supports the rear surface of the portable device 40.

The magnetic wireless charging systems 100 of the invention also include a waterproof gasket 28 disposed below the upper flange portion 15 of charging body 10. The waterproof gasket 28 preferably has a width comparable to the distance that the upper flange 15 extends out from charging body 10. Optionally, the outer perimeters of the upper flange 15 may extend beyond the outer perimeter of the waterproof gasket 28. In installation, the waterproof gasket 28 may be attached to the underside of the upper flange 15 using a waterproof adhesive, as well as attached to the mounting surface 30 (either directly on the mounting surface 30 or within an opening 32 in mounting surface 30) using a waterproof adhesive. In doing so, the waterproof gasket 28 may have adhesive on the upper and lower surfaces, or adhesive may be added thereto, to provide a water-tight seal around the charging body 10 when installed in the openings of surface 30. Optionally, in one or more embodiments the waterproof gasket 28 may additionally have one or more openings therein for receiving screws for securing the gasket 28 to the mounting surface 30.

Figure 8:
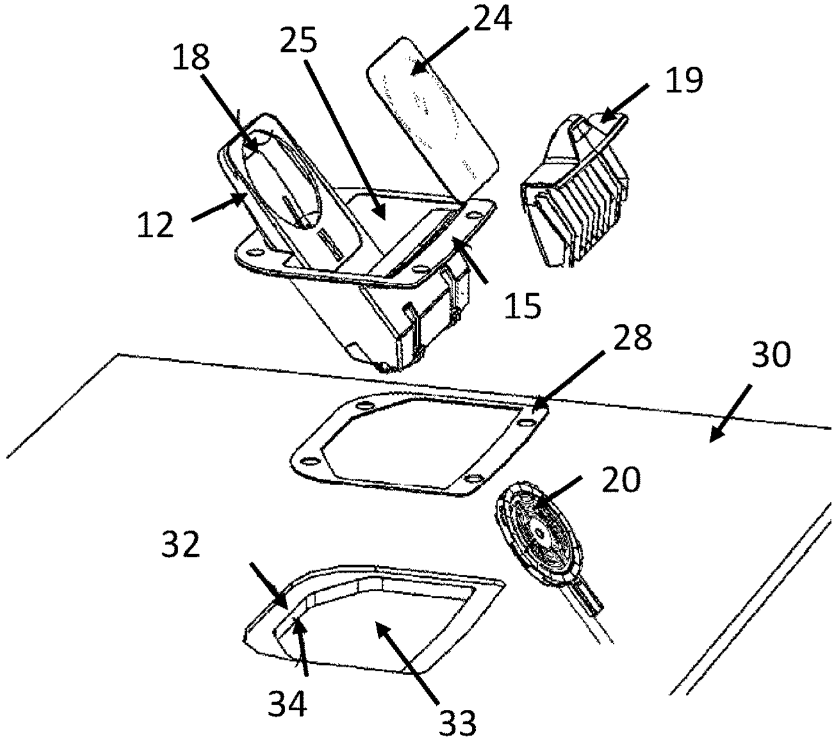
FIG. 8 illustrates an assembly of the waterproof magnetic wireless phone charger apparatus of FIG. 5 into an opening in a receiving surface for providing waterproof wireless charging or power supply in accordance with the invention.
Figure 9:
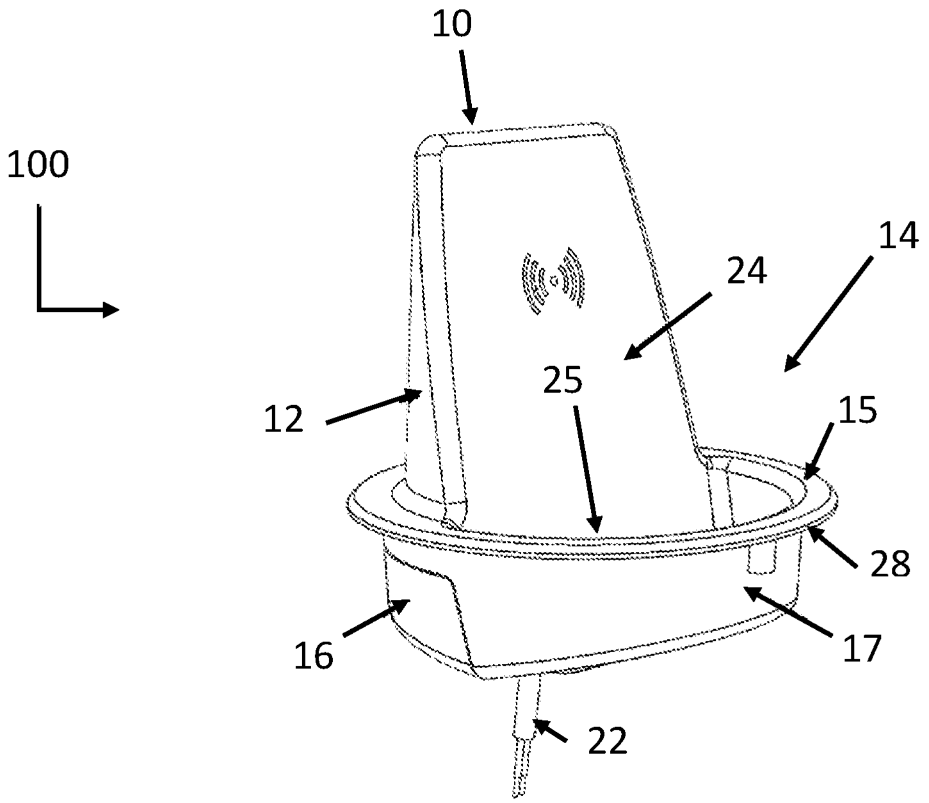
FIG. 9 is another wireless phone charger apparatus and system in accordance with embodiments of the invention for securing in an opening in a mounting surface.
Figure 10:
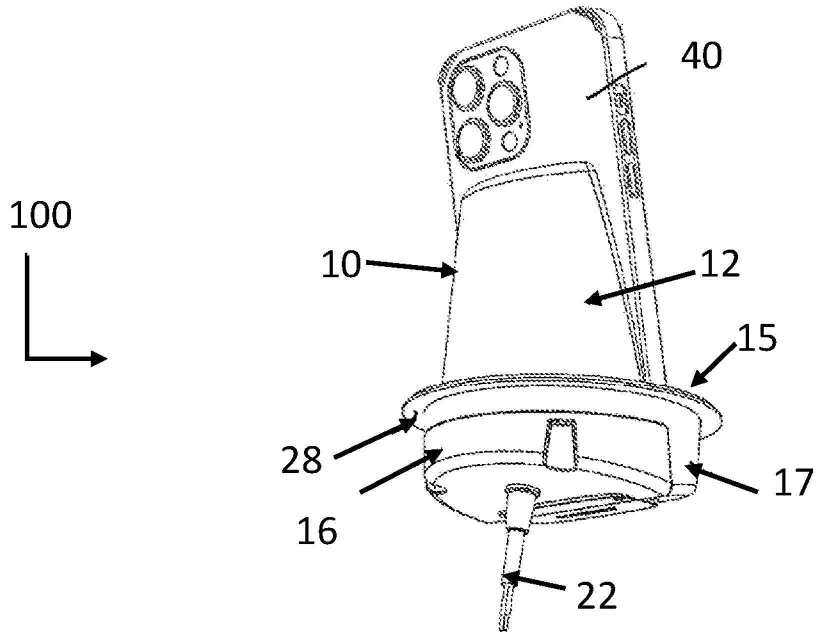
FIG. 10 illustrates a backside of the waterproof wireless phone charger apparatus and system of FIG. 9 securely holding a wireless mobile phone.

In one or more embodiments, referring to FIG. 8 the opening 33 in the mounting surface 30 may be partially recessed to provide a staged opening 33. The staged opening 33 may be a two-stage opening having a first opening 34 defined by sidewalls that is sized and configured to receive the lower portion 16 of charging body 10 through it. The staged second opening 32 is larger than the first opening 34 and resides above the first opening 34 and is cohesive therewith. The second opening 32 is compatible in size with the waterproof gasket 28, having a comparable width and thickness thereto, so that the waterproof gasket 28 fits entirely within the parameters of second opening 32 and is flush or coplanar with the surface of the mounting surface 30. In these embodiments the upper flange portion 15 of charging body 10 may reside above the surface of the mounting surface 30. Alternatively, the staged second opening 32 may be configured with a depth that is equal to the combined thickness of the upper flange portion 15 and the waterproof gasket 28. In these embodiments, both the upper flange portion 15 and waterproof gasket 28 fit entirely within the metes and bounds of the second opening 32, with the upper flange portion 15 being flush or substantially coplanar with the surface of the mounting surface 30. That is, the flange and gasket thickness, and the thickness of second opening 32, may be selected so that the top surface of the flange is above or below that of surface 30.

Referring to FIGS. 5-8, the present magnetic wireless charging systems 100 may also include a sprung lever 19 that fits and is secured inside opening 25 in the charging body 10. Sprung lever 19 may be a pivotal tension lever that moves forward and backward with respect to receiving surface 24. Its forward and backward movements are initiated upon insertion of device 40 into opening 25, whereby increased pressure is applied to the device 40 as the lever 19 moves backward (i.e., away from the receiving surface 24). The lower portion 16 of charging body 10 is provided with an angled front surface that accommodates the shape of lever 19 and provides an internal angled surface area for applied pressures of the sprung lever 19. Lower portion 16, at its front surface, may have openings therein for receiving and allowing movement of working components of lever 19 that allow it to move back and forth for applying pressure. The lever 19 is secured within the opening 25 of charging body 10 in a watertight manner so that the charging body 10 is waterproof. The sprung lever 19 may be deployed from the front of lower portion 16 to press against the front of device 40 being charged, thereby adding extra friction and/or pressure to device 40 (e.g., to the screen of phone 40) and prevent it from slipping out of charging body 10.

Figure 11:
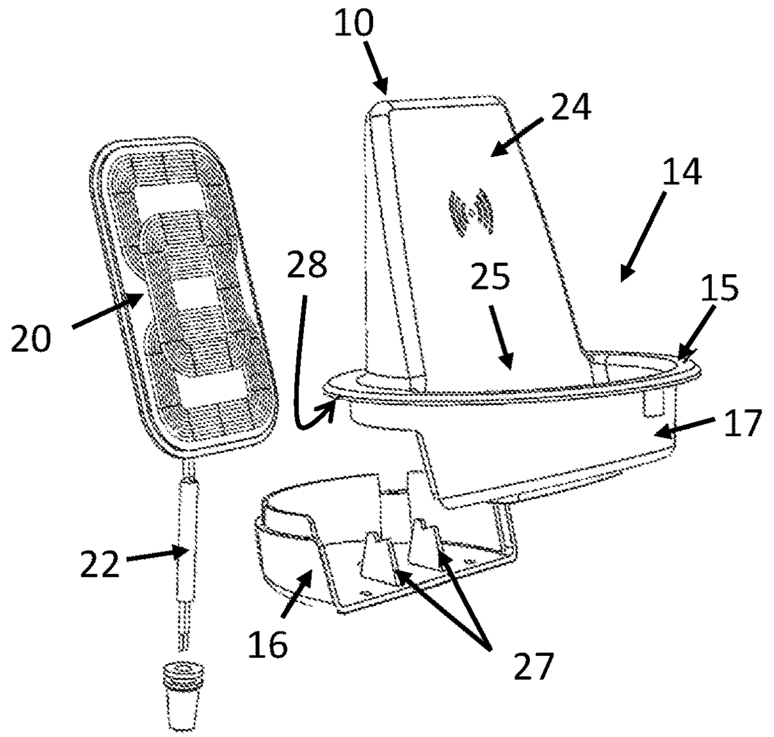
FIG. 11 illustrates in accordance with one or more embodiments of the invention, a system and assembly of a wireless energy transmitter for securely affixing within a charge receptacle or body of the invention.
Figure 12:
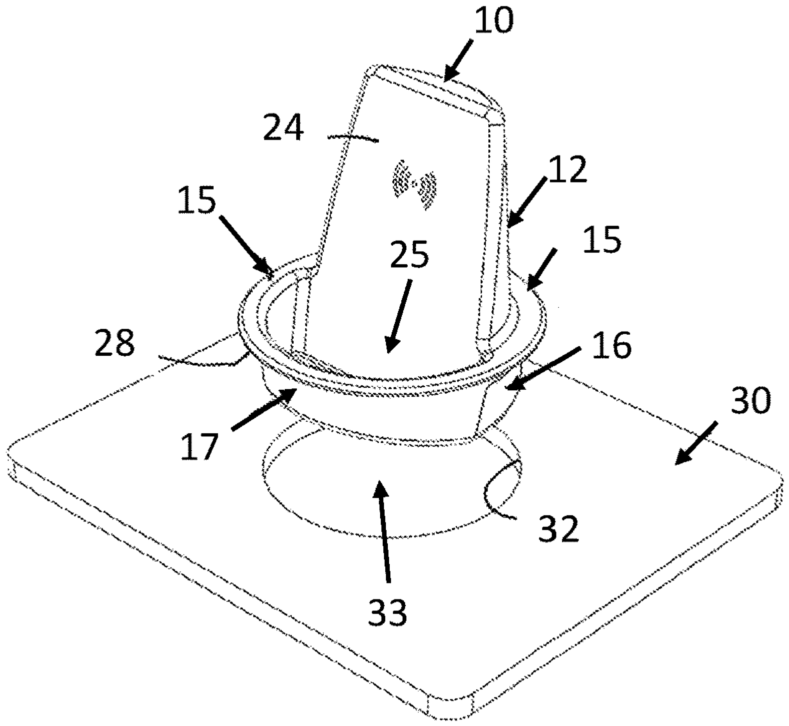
FIG. 12 illustrates a system and method of assembly of the waterproof wireless phone charger apparatus of FIG. 9 into an opening in a receiving surface for providing waterproof wireless charging or power supply in accordance with the invention.
Figure 13:
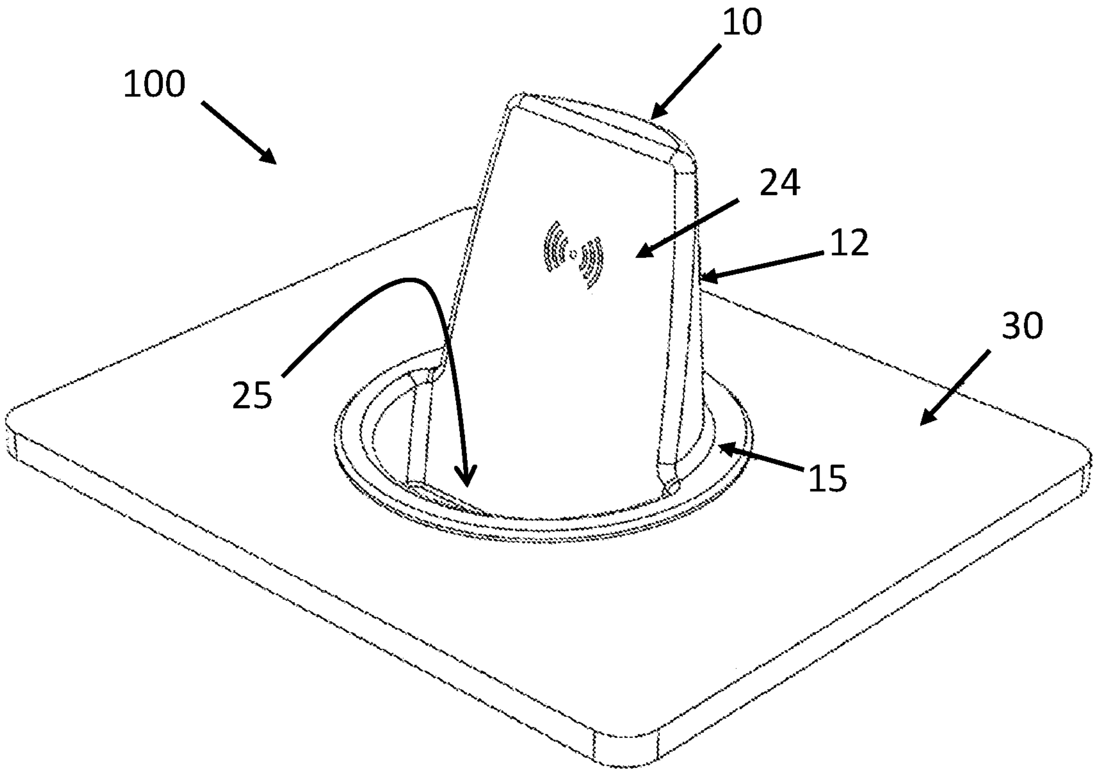
FIG. 13 illustrates the waterproof wireless phone charger apparatus of FIG. 9 securely installed in the receiving surface opening.

FIGS. 8, 11 and 12 show methods of installing the magnetic or non-magnetic wireless charging systems 100 of the invention. As shown, the lower portion 16 of charging body 10 is installed into an opening 33 in a mounting surface 30. In one or more embodiments, the mounting surface 30 may be on a boat, RV, or other environmental area exposed to water or moisture, and as shown in FIG. 12 the opening 33 may be a preexisting or newly formed cupholder. As shown in FIG. 11, the lower portion 16 may be a two-piece structure 16, 17 that snaps together, or referring to FIGS. 1 and 5, it may be a one-piece structure ready for use. The back portion 12 of charger 10 is either hollow with no openings on its charging surface 24, or it does have openings (e.g., openings 13, 18) for receiving and securing a magnetic or non-magnetic transmitter 20 therein. The wireless energy transmitter 20 is secured inside the back portion, and in those embodiments having a glass charging surface 24, such charging surface 24 is secured in a watertight fit to transmitter 20. The lower portion 16 of the charging body is received and secured within the opening 33 in mounting surface 30. The gasket 28 and/or the upper flange portion 15 are securely affixed to the mounting surface 30 as described herein.

In use, the device 40 in need of charging is provided into charging body opening 25, with the magnetized side of the device 40 being positioned against the charging surface 24 that has transmitter 20 with magnets thereunder. In one or more embodiments the opening 25 has a depth that allows the device 40 to be half recessed into such opening 25 when provided therein. The magnets 21 in transmitter 20 attract to magnetized device 40 for strongly and securely holding the device 40 against the charging surface 24. With the backside of device 40 being secured against the charging surface 24, in those embodiments implementing lever 19, the lever applies pressure to the front of device 40 to increase the holding strength of device 40 within charging body 10 and prevent it from moving or falling out of charging body 10.

The magnetic wireless energy transmitter 20 having its various circuitry (e.g., printed circuit boards) and magnets 21 may be provided into the angled back portion 12 from the backside thereof and provided with a watertight enclosure. Device 40 is positioned and secured against the angled charge surface (24) (i.e., through magnets and/or sprung levers), whereby the angle of charging surface 24 allows easy viewing of the portable device front screen when inserted into the charger apparatus 10. While the one or more magnets 21 in the transmitter 20 hold the device 40 against charging surface, the wireless energy transmitter 20 also has a one or more circuits capable of creating an electromagnetic field to transfer electrical energy wirelessly by induction to circuitry in the portable device 40.

When installed, the present invention provides water ingress protection of both the wireless charging apparatus 10 and the mounting surface 30, making it suitable for use in outdoor environments or other settings exposed to water, moisture or outdoor elements. The angled charge surface (24), the magnetic or non-magnetic transmitter 20 under such surface 24, and/or the lever 19 also allows easy and reliable storage and charging of non-magnet enabled devices 40' since such devices 40' reside in a resting angled position. The wireless charging systems 100 of the invention provide permanent and neatly installed waterproof magnetic wireless chargers that securely hold and wirelessly charge magnetic (or non-magnetic) enabled devices in a vehicle and/or outdoor recreational setting (e.g., a boat, marine vessels, RV, etc.), particularly those settings exposed to outdoor elements or outdoor environments (e.g., sun, wind, high or low temperatures, humidity, rainfall, waves, uneven or turbulent land or roads, etc.). The apparatus, systems and methods of the invention are directed to an encapsulated assembly for waterproof, wireless charging of wireless enabled devices that increase holding power of the device being charged through use of angled charging surfaces, magnets and/or tension levers, thereby providing a more durable and effective charging station for outdoor and/or rough or turbulent settings.

While the present invention has been particularly described, in conjunction with one or more specific embodiments, it is evident that many alternatives, modifications and variations will be apparent to those skilled in the art in light of the foregoing description. It is therefore contemplated that the description will embrace any such alternatives, modifications and variations as falling within the true scope and spirit of the present invention.

Thus, having described the invention, what is claimed is:

1. A waterproof wireless device charging system comprising:

a wireless charging body having a lower portion, an upper flange portion, and an angled back portion, the angled back portion having a hollow internal center and a sloped receiving surface;

an opening at a top side of the wireless charging body for receiving a wireless charging device;

a waterproof gasket; and a wireless energy transmitter having one or more wireless charging units;

wherein in installation the system comprises the wireless energy transmitter inserted into and secured within the hollow internal center of the angled back portion, the waterproof gasket residing between and contacting both the upper flange portion and a mounting surface, the lower portion of the wireless charging body secured within a mounting surface opening of the mounting surface, and the one or more wireless charging units of the transmitter adjacent the sloped receiving surface for securing the wireless charging device when inserted into the opening at the top side of the wireless charging body.

2. The system of claim 1 wherein the upper flange portion resides above and extends outward from the lower portion.

3. The system of claim 1 wherein the opening at a top side of the wireless charging body is formed by the lower portion, upper flange, and angled back portion.

4. The system of claim 1 wherein the angled back portion has a shape, size, and slope configured to allow resting of the wireless charging device.

5. The system of claim 1 wherein the wireless charging system is permanently or semi-permanently installed in the mounting surface.

6. The system of claim 1 wherein the mounting surface opening is a cupholder opening in the mounting surface.

7. The system of claim 6 wherein the cupholder opening is a newly formed cupholder opening in the mounting surface.

8. The system of claim 6 wherein the cupholder opening is a preexisting cupholder in the mounting surface.

9. The system of claim 1 wherein the mounting surface has a shape selected from the group consisting of round, semi-round, oval, semi-oval, square, semi-square, rectangular, semi-rectangular and any other geometric shape.

10. The system of claim 1 wherein the waterproof gasket is attached to an underside of the upper flange and the mounting surface using a waterproof adhesive.

11. The system of claim 1 wherein the wireless charging body is a monolithic one-piece structure with the sloped receiving surface comprising a part of said wireless charging body.

12. The system of claim 1 wherein the wireless charging body is a two-piece structure that attaches together with the sloped receiving surface comprising a part of said wireless charging body.

13. The system of claim 1 further including a tension lever residing within the opening at the top side of the wireless charging body, the tension lever moving forward and backward with respect to the sloped receiving surface for applying pressure to a front side of the wireless charging device residing in said opening.

14. A waterproof wireless device charging system comprising:

a wireless charging body having a lower portion adapted to fit into a cupholder opening in a mounting surface, an upper flange portion, and an angled back portion, the angled back portion having a hollow internal center and a sloped receiving surface;

an opening at a top side of the wireless charging body for receiving a wireless charging device;

a waterproof gasket; and a wireless energy transmitter having at least three overlapping wireless charging units;

wherein in installation the system comprises the wireless energy transmitter inserted into and secured within the hollow internal center of the angled back portion, the waterproof gasket residing between and contacting both the upper flange portion and the mounting surface, the lower portion of the wireless charging body secured within the cupholder opening in the mounting surface, and the at least three overlapping wireless charging units of the wireless energy transmitter adjacent the sloped receiving surface for securing the wireless charging device when inserted into the opening at the top side of the wireless charging body.

15. The system of claim 14 wherein the cupholder opening is a newly formed cupholder opening in the mounting surface.

16. The system of claim 14 wherein the cupholder opening is a preexisting cupholder in the mounting surface.

17. The system of claim 14 wherein the wireless energy transmitter is a magnetic wireless energy transmitter.

18. The system of claim 14 wherein the wireless energy transmitter is a non-magnetic wireless energy transmitter.

19. The system of claim 15 wherein the mounting surface resides in an environment susceptible to moisture, water, outdoor elements, or outdoor environments.

20. The system of claim 15 wherein the mounting surface resides in a moving vehicle selected from the group consisting of a boat, ship, motorcycle, recreation vehicle (RV), automobile, truck, train, public transport system, airplane, bike, and other like moving vehicles.

* * * * *